(12) United States Patent
Gudala et al.

(10) Patent No.: US 8,660,592 B2
(45) Date of Patent: Feb. 25, 2014

(54) SYSTEM AND METHOD FOR ENHANCING SHORT MESSAGE SERVICE (SMS) TEXT MESSAGES

(75) Inventors: Sridhar Gudala, Hyderabad, IN (US); Himangshu Chowdhury, Hyderabad, IN (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 13/179,976

(22) Filed: Jul. 11, 2011

(65) Prior Publication Data

US 2013/0017845 A1    Jan. 17, 2013

(51) Int. Cl.
*H04W 4/12* (2009.01)

(52) U.S. Cl.
USPC ........................................ 455/466; 455/414.4

(58) Field of Classification Search
USPC .................................... 455/466, 414.1–414.4
See application file for complete search history.

(56) References Cited

U.S. PATENT DOCUMENTS

| | | | |
|---|---|---|---|
| 6,119,014 A * | 9/2000 | Alperovich et al. .......... | 455/466 |
| 7,155,243 B2 | 12/2006 | Baldwin et al. | |
| 7,369,867 B2 | 5/2008 | Zabawskyj et al. | |
| 7,640,030 B2 | 12/2009 | Cai et al. | |
| 7,725,550 B2 | 5/2010 | Choi | |
| 7,751,836 B2 | 7/2010 | Bantukul et al. | |
| 2007/0233861 A1 | 10/2007 | Cai et al. | |
| 2007/0293248 A1* | 12/2007 | Kim et al. ..................... | 455/466 |
| 2008/0102799 A1 | 5/2008 | Dholakia et al. | |
| 2008/0167024 A1 | 7/2008 | Zabawskyj et al. | |
| 2008/0243619 A1* | 10/2008 | Sharman et al. ................ | 705/14 |
| 2009/0325603 A1* | 12/2009 | Van Os et al. ............. | 455/456.2 |
| 2010/0261491 A1* | 10/2010 | Alanara et al. ................ | 455/466 |
| 2011/0136516 A1* | 6/2011 | Ellis .............................. | 455/458 |

* cited by examiner

*Primary Examiner* — Allahyar Kasraian

(74) *Attorney, Agent, or Firm* — Armstrong Teasdale LLP

(57) ABSTRACT

A method of assembling a communication system includes providing a short message service (SMS) system. The SMS system includes at least one SMS text message transmission device coupled in communication with at least one SMS text message receiving device. The method also includes configuring the SMS system to transmit to the at least one SMS text message transmission device an SMS text message that includes an SMS character string that includes at least one character defined to represent a predetermined priority of the SMS text message. The method also includes configuring the at least one SMS text message receiving device to notify a user of the predetermined priority of the SMS text message.

20 Claims, 5 Drawing Sheets

SYSTEM AND METHOD FOR ENHANCING SHORT MESSAGE SERVICE (SMS) TEXT MESSAGES

BACKGROUND OF THE INVENTION

The embodiments described herein relate generally to mobile or wireless communication and, more particularly, to methods and apparatus for enhancing short message service (SMS) text messages transmitted to mobile communication devices.

Many known wireless communication networks include short message service (SMS) text messaging features that enable mobile users to easily and efficiently transmit and receive text messages using a wireless device such as a cellular, or cell phone or other wireless apparatus. Typically, an SMS text message is composed using a cell phone or other transmission device, and transmitted therefrom to a destination wireless device via one or more routing nodes. For example, an e-mail message may be generated using a computer terminal residing within a data network (e.g., the Internet) and transmitted to a mobile terminal within a wireless network as an SMS text message. SMS text messages may also be automatically generated by monitoring systems. For example, security systems may generate SMS text messages to notify a remote user of an alarm.

Known SMS text messaging systems do not have prioritization features. For example, users with the destination wireless device do not have the option to prioritize their received text messages. For example, a user may desire a feature that distinguishes a routine text message received from a friend or family member from alarm text messages generated by a monitoring system. Many known SMS text messaging systems utilize 160 seven-bit characters for a total of 1120 binary bits, wherein 160 characters is the maximum size of a text message transmission. In such known SMS text messaging systems, the size limitations exclude the use of standard text features found on a computer workstation and word processing applications, e.g., text italicization, text bolding, and text coloring (other than black). However, some SMS text messaging systems use standards other than the 160-character standard that include such text enhancement features. For example, SMS extensions such as Enhanced Messaging Service (EMS) can permit up to 8,000 bits to be transmitted in up to eight separate 1000-bit strings that are concatenated at the destination device. However, these additional features rely upon specialized transmission, routing, and receiving equipment that may be costly to implement. Moreover, such systems may require additional code programming to ensure that the individual message strings are strung together at the recipient's device.

In addition, known SMS text messaging systems do not have features that enable certain text messages to be routed only to predetermined individuals and/or devices. More specifically, given a set of potential recipients, sending certain test messages to subsets of those potential recipients is not an available option. Rather, typically, text messages are sent to only a single individual, thereby excluding additional intended recipients, or are sent to all individuals on a list, regardless of need to be notified. Further, many known SMS text messaging systems do not have spam filtering features. As such, users of these systems may receive an unacceptable volume of unwanted text messages from undesirable sources. Those SMS text messaging systems that do include direct spam filtering of SMS messages, generally, require significant upgrades to the existing SMS service infrastructure. That may be expensive and, that may require a significant amount of time to implement.

BRIEF DESCRIPTION OF THE INVENTION

In one aspect, a method of assembling a communication system is provided. The method includes providing a short message service (SMS) system. The SMS system includes at least one SMS text message transmission device coupled in communication with at least one SMS text message receiving device. The method also includes configuring the SMS system to transmit to the at least one SMS text message transmission device an SMS text message that includes an SMS character string that includes at least one character defined to represent a predetermined priority of the SMS text message. The method also includes configuring the at least one SMS text message receiving device to notify a user of the predetermined priority of the SMS text message.

In another aspect, a short message service (SMS) system is provided. The SMS system includes at least one SMS text message transmission device configured to transmit an SMS character string. The SMS character string includes at least one character defined to be indicative of a predetermined priority of an SMS text message. The SMS system also includes at least one SMS text message receiving device coupled in communication with the at least one SMS text message transmission device. The at least one SMS text message receiving device is configured to notify a user of the predetermined priority of the SMS text message.

In yet another aspect, a communication system is provided. The communication system includes at least one database server. The communication system also includes a short message service (SMS) system coupled in communication with the at least one database server. The SMS system includes at least one SMS text message transmission device configured to transmit an SMS character string that includes at least one character defined to be indicative of a predetermined priority of an SMS text message. The SMS system also includes at least one SMS text message receiving device coupled in communication with the at least one SMS text message transmission device. The at least one SMS text message receiving device is configured to notify a user of the predetermined priority of the SMS text message.

DETAILED DESCRIPTION OF THE INVENTION

Figure 1:
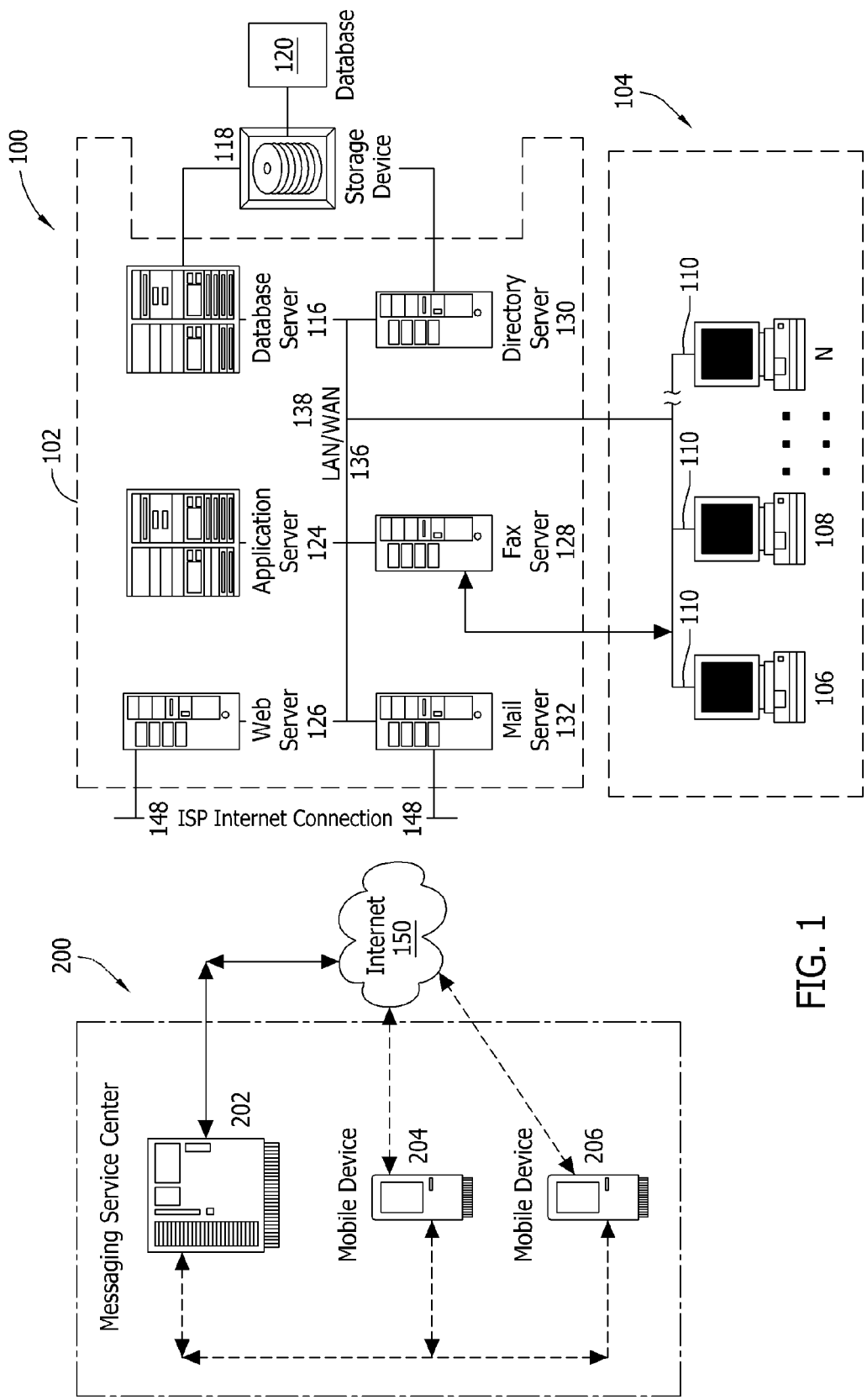
FIG. 1 is a schematic diagram of an exemplary communication system that includes an exemplary short message service (SMS) system.

FIG. 1 is a schematic diagram of an exemplary communication system 100 that facilitates communication between individuals and systems interchangeably via a plurality of communication methods and channels. In the exemplary embodiment, system 100 includes a server system 102 that is communicatively coupled to a client network 104. Client network 104 includes a plurality of computers 106 and 108 (through N) that each include a web browser and/or a network connection 110 that provide access to server system 102 using the Internet and/or client network 104. Client network 104 is communicatively coupled to server system 102 through many interfaces including, without limitation, the Internet, a local area network (LAN), a wide area network (WAN), an integrated services digital network (ISDN), a dial-up-connection, a digital subscriber line (DSL), and/or a cable modem. Client network 104 can be any device capable of accessing the Internet including, but not limited to, desktop computers 106 through N, laptop computers (not shown), personal digital assistants (PDAs) (not shown), or other web-based connectable equipment (not shown).

Server system 102 includes at least one database server 116 communicatively coupled to at least one storage device 118. Storage device 118 is populated with at least one database 120. In the exemplary embodiment, database 120 is populated with a plurality of records that may include, without limitation, predetermined alarm conditions, predetermined text notifications to be transmitted when specific alarm conditions exist, text message prioritization codes, names and device identification tags associated with individuals scheduled to receive text messages as a function of the nature of predetermined notifications, alarms received, notifications transmitted, acknowledgements received, alarm conditions for which no acknowledgement was received, and alarm notifications retransmitted. At least some of the aforementioned database records and data population include date-stamps and time-stamps. Also, in the exemplary embodiment, database 120 is stored remotely from server system 102. Alternatively, database 120 may be decentralized. Further, in the exemplary embodiment, a person can access database 120 via client network 104 by logging onto server system 102.

In the exemplary embodiment, server system 102 includes an application server 124, a web server 126, a fax server 128, a directory server 130, and a mail server 132. Storage device 118 is operatively coupled to directory server 130 as well as database server 116. Also, in the exemplary embodiment, servers 116, 124, 126, 128, 130, and 132 are operatively coupled within a local area network (LAN) 136 and/or a wide area network 138. In addition, LAN 136/WAN 138 is operatively coupled to client network 104 as described above.

Also, in the exemplary embodiment, communication system 100 includes at least one Internet Service Provider (ISP) Internet connection 148 that operatively couples server system 102 and client network 104 with the Internet 150.

Further, in the exemplary embodiment, server system 102 is operatively coupled to a short message service text messaging system 200, or SMS system 200. SMS system 200 includes a messaging service center 202 and a plurality of mobile communication devices 204 and 206. Messaging service center 202 is consistent with those devices that adhere to the Global System for Mobile Communications (GSM) standards. Messaging service center 202 is configured with features that include, without limitation, COM ports, baud rates, data bits, parity, and stop bits (none shown). Messaging service center 202 is also configured with features that facilitate status tracking of SMS text messages transmitted therefrom, received by the mobile users, pending receipt by the mobile users, deleted, and pending deletion. Mobile communication devices 204 and 206 include, without limitation, cellular phones and PDAs. Also, while only two devices 204 and 206 are shown in FIG. 1, any number of devices 204 and 206 may be used with SMS system 200 that enable operating system 200 to operate as described herein.

FIG. 1 illustrates one particular exemplary architecture for communication system 100 and SMS system 200. Alternatively, any computing architecture that enables communication system 100 and SMS system 200 as described herein may be used. More specifically, the embodiments illustrated and described herein as well as embodiments not specifically described herein, but within the scope of this disclosure, constitute exemplary means for performing communications exchange, and more particularly, constitute an exemplary means for transmitting a text message to at least one user and a means to receive an acknowledgment from those users. For example, server system 102 and/or client network 104, or any other similar computer devices, include a memory device and a processor (neither shown) operatively coupled thereto for executing instructions. The processor is programmed to perform one or more operations described herein by encoding an operation as one or more executable instructions, thus providing executable instructions to the memory device. Therefore, any processing device programmed with computer-executable instructions to execute processes and techniques with a memory device as described herein may be used to enable communication system 100 as described herein.

Moreover, as used herein, the memory device is one or more devices that enable transmission of information, e.g., executable instructions and/or other data to be stored and retrieved. The memory device may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Operating communication system 100 and SMS system 200 are described below.

Figure 2:
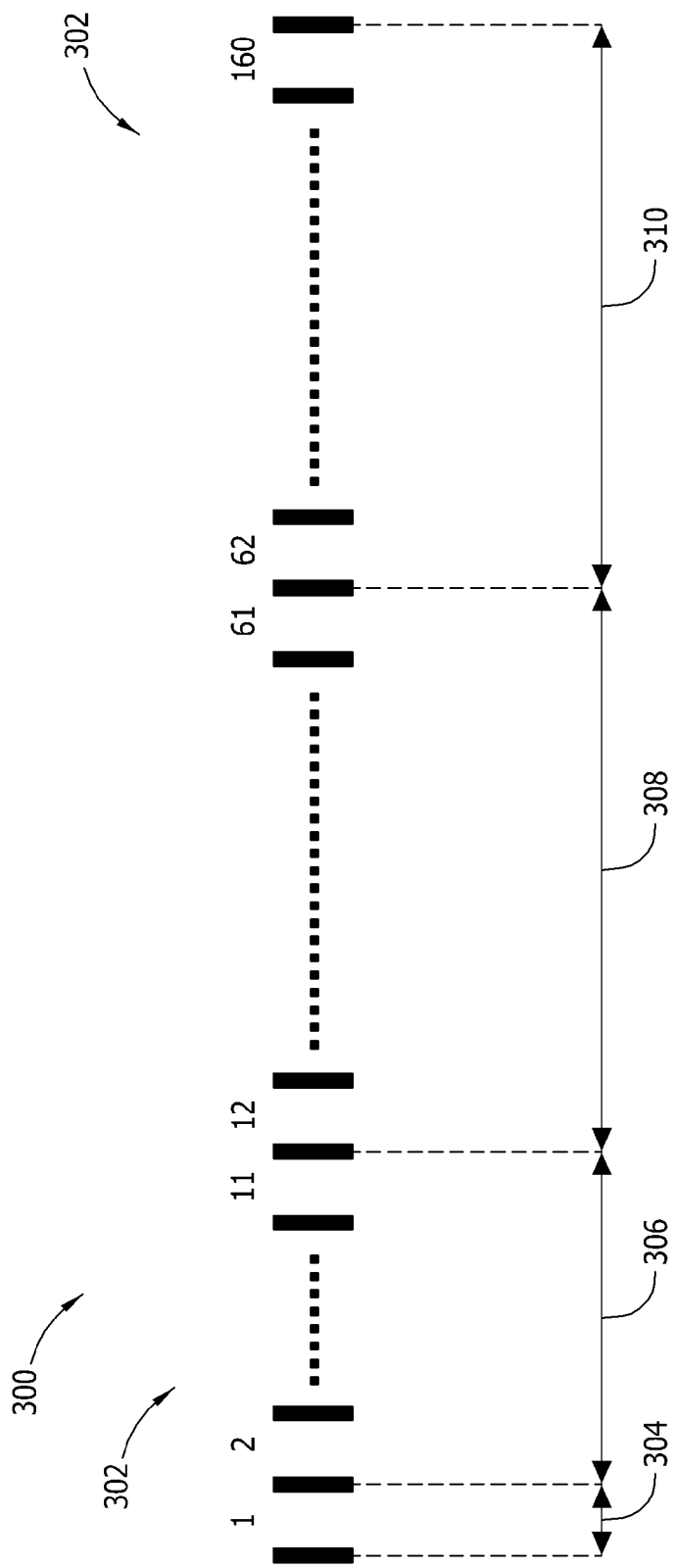
FIG. 2 is a schematic view of an exemplary SMS text message character string sequence that may be used with the SMS system shown in FIG. 1.

FIG. 2 is a schematic view of an exemplary SMS text message character string sequence 300 that may be used with SMS system 200 (shown in FIG. 1). In the exemplary embodiment, character string sequence 300 includes a plurality of characters 302. Each character 302 is a seven-bit character, and string sequence 300 includes 160 characters 302 for a total of 1120 binary bits, wherein 160 characters 302 is the maximum size of a text message transmitted via SMS system 200. Each of characters 302 is assigned a sequential integer from "1" through "160".

In the exemplary embodiment, a first portion 304 of character string 300 includes first character "1" reserved to assign a priority to character string 300, or more specifically, the substantive content of the associated message received by at least one of mobile communication devices 204 and 206. Also, in the exemplary embodiment, character "1" includes at least one ASCII (American Standard Code for Information Interchange) character to indicate one of high priority, low priority, and normal priority. Specifically, for indicating high priority, the symbol "#" is assigned, for low priority, the symbol "$" is assigned, and for normal priority, the symbol "%" is assigned. Alternatively, any symbols may be selected for designating the hierarchy of priority. Also, alternatively, more than one character may be used to designate priority.

However, each character used to designate priority is one less character to available for use in the substantive portion of the SMS text message (described further below).

Further, in the exemplary embodiment, at least one SMS text message generation device, including, without limitation, one of desktop computers 106 through N (shown in FIG. 1) generates an SMS text message (not shown). Alternatively, in the exemplary embodiment, communication system 100 retrieves an automated SMS text message (not shown) from at least one SMS text message generation device, including, without limitation, database 120 via database server 116 and storage device 118 (all shown in FIG. 1). The user assigns a priority to the text message. The text messages retrieved from database 120 are assigned a predetermined priority, such priority residing is database 120. Character string 300 is transmitted to messaging service center 202 with first character "1" containing the predetermined priority designation. The priority of the incoming text message is displayed on at least one SMS text message receiving device including, without limitation, mobile communication devices 204 and 206 and may be accompanied with a particular audible notification. The prioritization features as described herein provide users with the destination wireless device with a feature that distinguishes high priority alarms generated by a monitoring system, for example, and low or normal priority routine text messages from friends and/or family members.

A second portion 306 of character string 300 includes characters "2" through "11" reserved to determine if an incoming text message to mobile communication devices 204 and 206 is either desirable or non-desirable. Examples of non-desirable text messages include, without limitation, spam. Alternatively, more or less than ten characters may be used to designate desirability. However, each character used to designate desirability is one less character available for use in the substantive portion of the SMS text message (described further below).

In the exemplary embodiment, second portion 306 includes a series of unique letters, numbers, and/or symbols to define a unique, encrypted identification key (not shown) shared between at least one SMS text message transmission device and at least one SMS text message receiving device. Examples of SMS text message transmission devices include, without limitation, server system 102, client network 104, and messaging service center 202. Examples of SMS text message receiving devices include, without limitation, messaging service center 202 and mobile communication devices 204 and 206. Since such unique, encrypted identification key is shared between the SMS text message transmission and receiving devices, the key facilitates spam filtering by informing users with the destination wireless device with a feature that distinguishes, e.g., text messages generated by a monitoring system from those generated by spammers. Therefore, second portion 306 of character string 300 facilitates spam filtering without significant and expensive upgrades to existing SMS service infrastructure, and provides a short-term solution to spam receipt.

A third portion 308 of character string 300 includes characters "12" through "61" that are reserved to filter transmission/receipt of SMS text messages via SMS system 200. More specifically, communication system 100 and SMS system 200 cooperate to determine if an outgoing text message from either of server system 102 and client network 104 is to be limited to receipt by only a portion of mobile communication devices 204 and 206. For example, without limitation, automated SMS text messages generated by server system 102 are designated to be transmitted to predetermined mobile communication devices 204 and 206 as a function of the subject of and/or content of the stored messages in database 120 and designated recipients based on such subject/content, also stored in database 120. Distribution of SMS text messages is determined with at least one ASCII character in the first character 302 of third portion 308 and at least one ASCII character in the last character 302 of third portion 308. More or less than 50 characters may be used to designate such distribution of SMS text messages. However, each character not used to designate desirability is one more character available for use in the substantive portion of the SMS text message (described further below). Therefore, such filtering facilitates routing predetermined text messages to only predetermined individuals and/or devices, thereby facilitating control of information distribution and reducing receipt of unnecessary text messages by certain individuals.

A fourth portion 310 of character string 300 includes characters "62" through "160" that are reserved for the substantive portion of the SMS text message to be transmitted to mobile communication devices 204 and 206. Fourth portion 310 may be a unique SMS text message generated by a user via client network 104 or may be an automated SMS text message from server system 102.

For example, without limitation, automated SMS text messages generated by server system 102 are designated to be transmitted to predetermined mobile communication devices 204 and 206 as a function of the subject of and/or content of the stored messages in database 120 and designated recipients based on such subject/content, also stored in database 120. Alternatively, more or less than 99 characters 302 may be available for use in the substantive portion of the SMS text message, that is, fourth portion 310.

Also, in the exemplary embodiment, fourth portion 310 includes at least some characters 302 that may be used to define a body of a text message including text formatting that includes at least one of italicized text, bold text, and text with a color other than black. Such text formatting may be selected by a user of client network 104 or reside on database 120 as predetermined formatting. For example, when such text formatting is implemented by text properties stored in database 120, the stored text properties determine which characters 302 of the text message within fourth portion 310 requires at least one of the text color change, the bold font, and the italic font. Specifically, such stored text properties include, without restriction, the length of fourth portion 310, the starting position within fourth portion 310, and the ending position within fourth portion 310 of the text color change, the bold font, and the italic font.

Therefore, text formatting may be added to SMS text messages via communication system 100 including SMS system 200 without use of SMS extensions such as Enhanced Messaging Service (EMS). The specialized transmission, routing, and receiving equipment may be costly to implement. The additional code programmed therein indicating that individual message strings should be strung together at the recipient's device may also be costly to implement.

Figure 3:
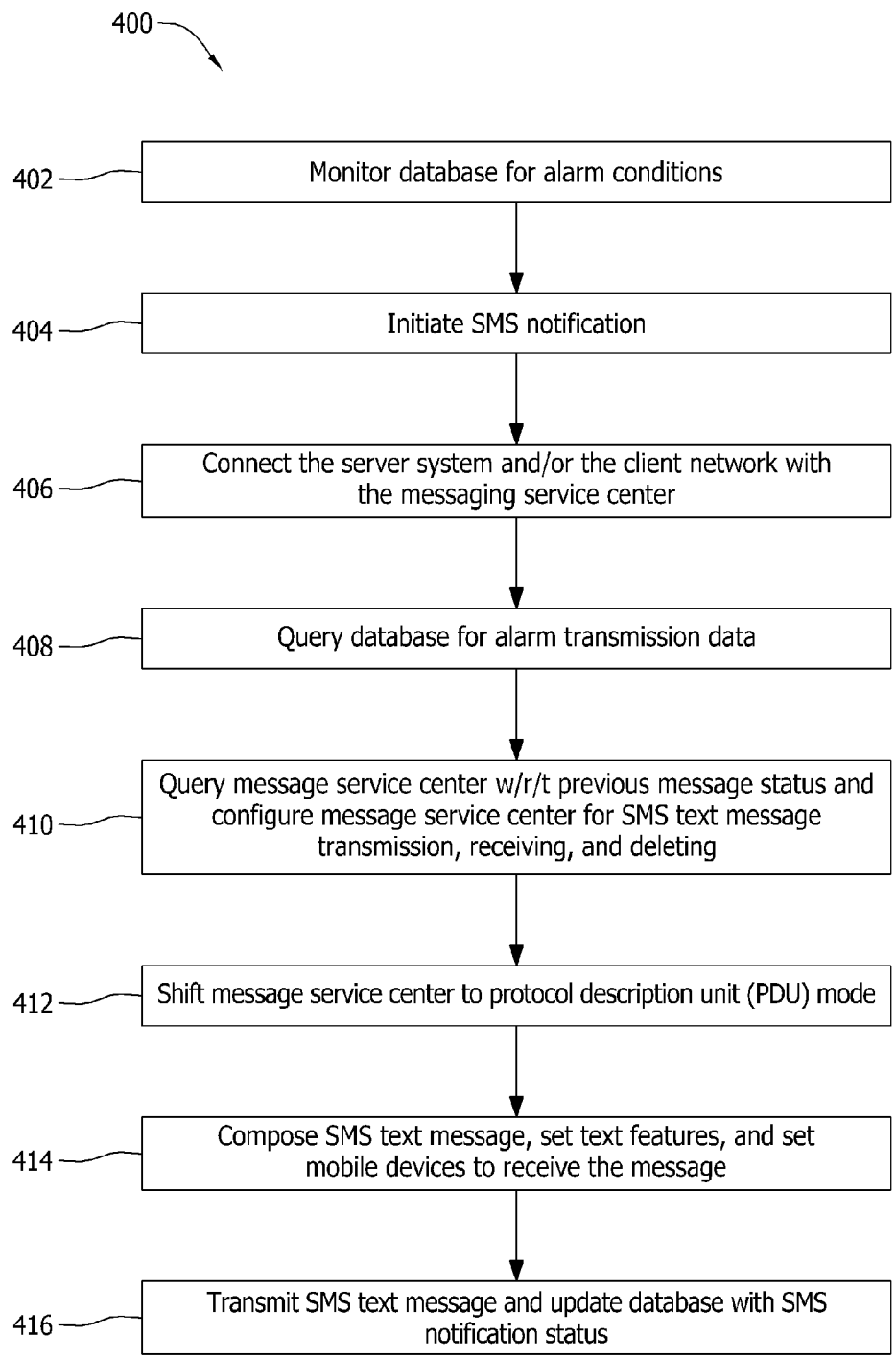
FIG. 3 is a flow chart of an exemplary alarm notification sequence that may be implemented using the communication system and the SMS system shown in FIG. 1.

FIG. 3 is a flow chart of an exemplary alarm notification sequence 400 using communication system 100 and SMS system 200 (both shown in FIG. 1). In the exemplary embodiment, communication system 100 monitors 402 database server 116 and database 120 (both shown in FIG. 1) for alarm conditions. Such alarm conditions may include, without limitation, unit trip events for electric power generators and shaft torque excursions at wind turbine facilities (neither shown). Database 120 includes a plurality of records (not shown) that include operating parameters and associated alarm setpoints. In the event of an alarming condition, SMS text message notification is initiated 404.

Also, in the exemplary embodiment, server system 102 and/or client network 104 (both shown in FIG. 1) is/are coupled 406 with messaging service center 202 (shown in FIG. 1) via ISP Internet connections 148 and Internet 150 (both shown in FIG. 1). Database 120 is queried 408 for alarm transmission data, including, without limitation, the nature of the alarming condition, time of alarm, and predetermined alarm message content. Message service center 202 is queried 410 with respect to the status of previously transmitted and stored SMS text messages and configures message service center 202 for SMS text message transmission, receipt by the mobile users, and deletion. Moreover, message service center 202 is shifted 412 to protocol description unit (PDU) mode.

Further, in the exemplary embodiment, the SMS text message is composed 414 with the predetermined text features, and the assigned phone numbers of the mobile devices to receive the text message are set. The SMS text message is configured using character string sequence 300 (shown in FIG. 2) including first portion 304 for priority, second portion 306 for spam filtering, third portion 308 for message filtering, and fourth portion 310 for the body of the text message, which includes defining text formatting with at least one of italicized text, bold text, and text with a color. In general, alarming conditions will define a "high" priority. The SMS text message may be previously composed and is resident within database 120, or, a user may compose a unique text message at one of desktop computers 106 through N (shown in FIG. 1). The SMS text message is transmitted 416 and database 120 is updated with SMS notification status for the associated alarm.

Figure 4:
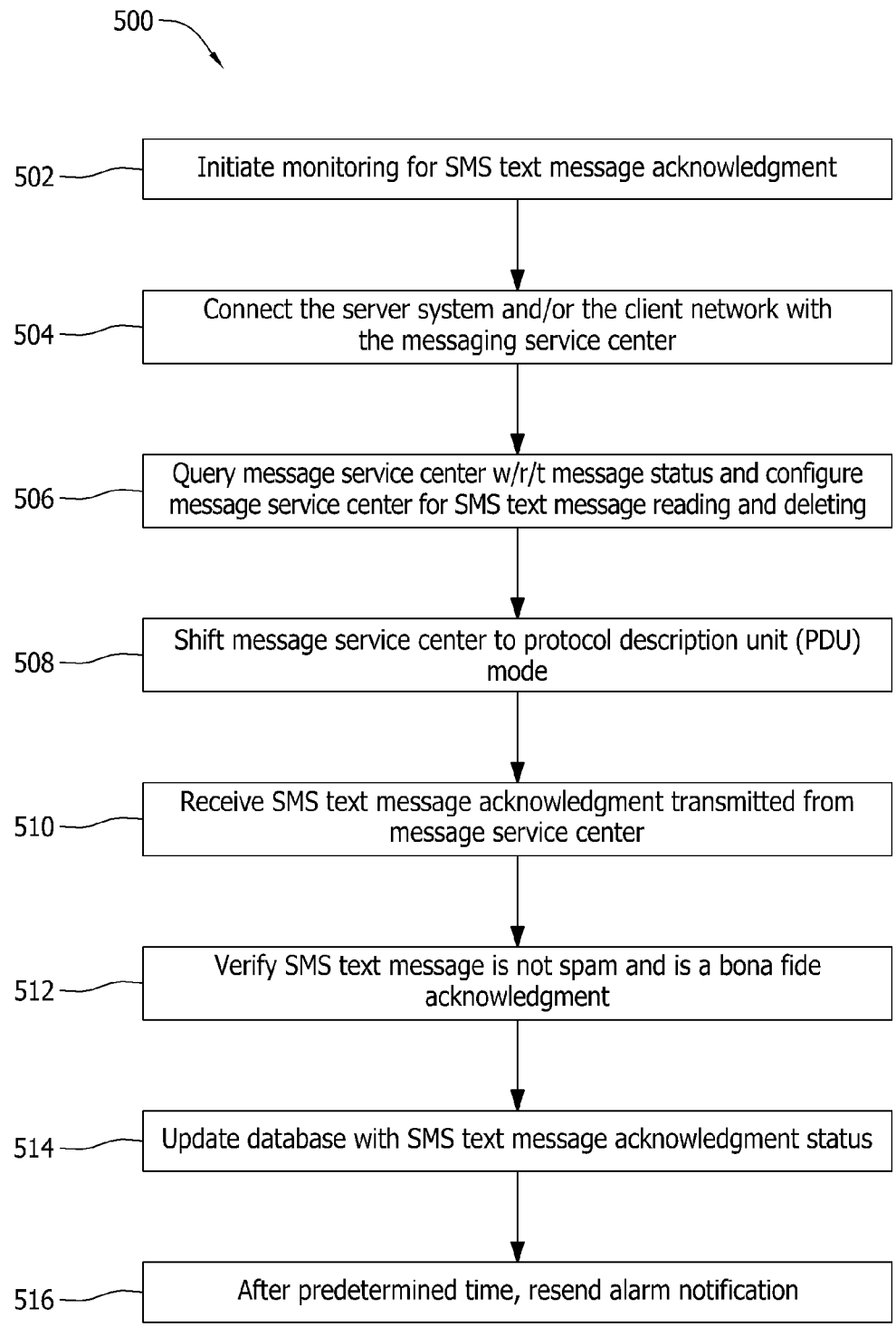
FIG. 4 is a flow chart of an exemplary alarm acknowledgment sequence using the communication system and the SMS system shown in FIG. 1.

FIG. 4 is a flow chart of an exemplary alarm acknowledgment sequence 500 using communication system 100 and SMS system 200 (both shown in FIG. 1). In the exemplary embodiment, monitoring for SMS text message acknowledgement by the mobile users is initiated 502. Server system 102 and/or client network 104 (both shown in FIG. 1) is/are coupled 504 with messaging service center 202 (shown in FIG. 1) via ISP Internet connections 148 and Internet 150 (both shown in FIG. 1). Message service center 202 is queried 506 with respect to the status of the transmitted and stored SMS text messages associated with the subject alarm and configures message service center 202 for SMS text message reading and deletion by the mobile users. Moreover, message service center 202 is shifted 508 to PDU mode.

Also, in the exemplary embodiment, the SMS text message acknowledgement is transmitted 510 from message service center 202 and received within database 120. The SMS text message acknowledgement is verified 512 to not be spam and is a bona fide acknowledgement. Database 120 is updated 514 with the SMS text message acknowledgement status. If after a predetermined period of time, the acknowledgement is not received, message service center 202 resends 516 alarm notification.

Figure 5:
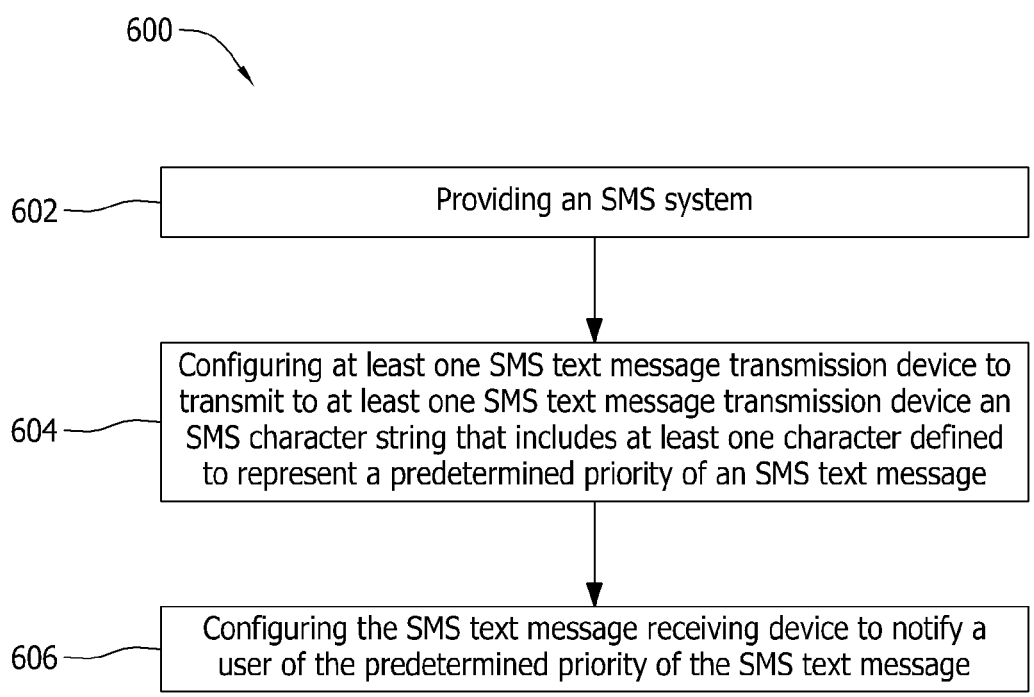
FIG. 5 is a flow chart of an exemplary method of assembling the communication system shown in FIG. 1.

FIG. 5 is a flow chart of an exemplary method 600 of assembling communication system 100 (shown in FIG. 1). In the exemplary embodiment, SMS system 200 (shown in FIG. 1) is provided 602. SMS system 200 includes at least one SMS text message transmission device coupled in communication with at least one SMS text message receiving device. Examples of SMS text message transmission devices include, without limitation, server system 102, client network 104, and messaging service center 202 (all shown in FIG. 1). Examples of SMS text message receiving devices include, without limitation, messaging service center 202 and mobile communication devices 204 and 206 (all shown in FIG. 1). The SMS text message transmission device is configured 604 to transmit to the SMS text message transmission device SMS character string 300 (shown in FIG. 2). String 300 includes at least one character 302/304 defined to represent a predetermined priority of an SMS text message. The SMS text message receiving device is configured 606 to notify a user of the predetermined priority of the SMS text message.

In contrast to known SMS text messaging systems that use standardized 160-character strings, the SMS text messaging systems and the 160-character strings, both described herein, enable features not found in known SMS text messaging systems. Specifically, in contrast to known SMS text messaging systems, the 160-character string generated, transmitted, and received by the SMS text messaging system described herein enables prioritization features that provide users with an ability to distinguish text messages with varying priorities. Also, in contrast to known SMS text messaging systems, the 160-character string generated, transmitted, and received by the SMS text messaging system described herein enables the use of text features such as text italicization, text bolding, and text coloring (other than black) without using SMS extensions and/or without requiring the concatenation of multiple character strings. Further, in contrast to known SMS text messaging systems, the 160-character string as generated, transmitted, and received by the SMS text messaging system described herein routes certain text messages to only predetermined individuals and/or to specified devices, based on the subject and/or content of the text message. Moreover, in contrast to known SMS text messaging systems, the 160-character string generated, transmitted, and received by the SMS text messaging system described herein enables spam to be filtered.

An exemplary technical effect of the methods, systems, and apparatus described herein includes at least one of (a) enabling prioritization features that provide users with the ability to distinguish text messages with varying priorities; (b) enabling the use of text features that include text italicization, text bolding, and text coloring (other than black); (c) routing certain text messages to only predetermined individuals and/or devices as a function of the subject and/or content of the text message; and (d) filtering of spam.

Described herein are exemplary embodiments of SMS text messaging systems and 160-character strings that enable features, such as prioritization features that provide users with the ability to distinguish text messages with varying priorities. Also, the SMS text messaging system described herein enables the use of text features, such as text italicization, text bolding, and text coloring (other than black) without using SMS extensions and concatenation of multiple character strings. Therefore, costs associated with specialized transmission, routing, and receiving equipment and costs associated with additional code programmed may be avoided. Further, certain text messages may be routed to only predetermined individuals and/or to specified devices based on the subject and/or content of the text message. Therefore, such filtering facilitates routing predetermined text messages to only predetermined individuals and/or devices, thereby facilitating control of information distribution and reducing receipt of unnecessary text messages by certain individuals. Moreover, a unique, encrypted identification key is shared between the SMS text message transmission devices and the SMS text message receiving devices to enable spam filtering. Therefore, significant and expensive upgrades to existing SMS service infrastructure are avoided.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A method of assembling a communication system, said method comprising:
   providing a short message service (SMS) system that includes at least one SMS text message transmission device coupled in communication with at least one SMS text message receiving device;
   configuring the SMS system to transmit to the at least one SMS text message transmission device an SMS text message that includes an SMS character string that includes:
      a first portion including at least one character defined to represent a predetermined priority of the SMS text message;
      a second portion including at least one character defined to distinguish whether the SMS text message is one of desirable and non-desirable, wherein non-desirable SMS text messages include spam;
      a third portion including at least one character defined to filter the SMS text message as a function of a predetermined distribution; and
      a fourth portion including at least one character defining a body of the SMS text message; and
   configuring the at least one SMS text message receiving device to notify a user of the predetermined priority of the SMS text message.

2. A method in accordance with claim 1, wherein configuring the SMS system comprises configuring the at least one SMS text message transmission device to transmit the SMS text message in which a first character of the SMS character string is indicative of the predetermined priority of the SMS text message.

3. A method in accordance with claim 1, wherein configuring the second portion of the SMS character string to include at least one character defined to distinguish whether the SMS text message is one of desirable and non-desirable comprises configuring the at least one SMS text message transmission device and the at least one SMS text message receiving device to share a unique identification key, wherein the SMS character string also includes at least one character associated with the unique identification key, wherein the unique identification key identifies the SMS text message as one of desirable and non-desirable.

4. A method in accordance with claim 1, wherein configuring the third portion of the character string to include at least one character defined to filter the SMS text message as a function of a predetermined distribution comprises configuring the at least one SMS text message transmission device to transmit the SMS character string with at least one character defined to differentiate a first SMS text message receiving device from a second SMS text message receiving device.

5. A method in accordance with claim 4, wherein configuring the at least one SMS text message transmission device to transmit the SMS character string that further includes at least one character defined to differentiate a first SMS text message receiving device from a second SMS text message receiving device comprises defining a plurality of characters that determine a distribution of the SMS text message as a function of a subject of the SMS text message.

6. A method in accordance with claim 1, wherein configuring the fourth portion of the character string to include at least one character defining a body of the SMS text message comprises configuring the at least one SMS text message transmission device to transmit an SMS character string that also includes at least one character defined to configure the body of the SMS text message to include text formatting including at least one of italicized text, bold text, and text with a color other than black.

7. A method in accordance with claim 1 further comprising:
   coupling at least one database server in communication with the SMS system; and
   coupling the at least one database server in communication with at least one database.

8. A method in accordance with claim 7 further comprising configuring the at least one database to include at least one record that represents at least one of:
   an SMS notification status of the SMS text message transmitted by the at least one SMS text message transmission device; and
   an SMS acknowledgement status by the user of the at least one SMS text message receiving device.

9. A short message service (SMS) system comprising:
   at least one SMS text message transmission device configured to transmit an SMS character string comprising:
      a first portion comprising at least one character defined to be indicative of a predetermined priority of an SMS text message;
      a second portion comprising at least one character defined to distinguish whether said SMS text message is one of desirable and non-desirable, wherein non-desirable SMS text messages include spam;
      a third portion comprising at least one character defined to filter said SMS text message as a function of a predetermined distribution; and
      a fourth portion comprising at least one character defining a body of said SMS text message; and
   at least one SMS text message receiving device coupled in communication with said at least one SMS text message transmission device, said at least one SMS text message receiving device configured to notify a user of the predetermined priority of said SMS text message.

10. An SMS system in accordance with claim 9, wherein said at least one SMS text message transmission device is configured to transmit said SMS text message in which said at least one character in said first portion of said SMS character string configured to be indicative of a predetermined priority of said SMS text message comprises a first character of said SMS character string.

11. An SMS system in accordance with claim 9, wherein said at least one SMS text message transmission device and said at least one SMS text message receiving device are further configured to share a unique identification key, wherein said second portion of said SMS character string comprising at least one character defined to distinguish whether said SMS text message is one of desirable and non-desirable comprises at least one character associated with said unique identification key, wherein said unique identification key identifies said SMS text message as one of desirable and non-desirable.

12. An SMS system in accordance with claim 9, wherein said at least one SMS text message transmission device is further configured to transmit said SMS character string, wherein said third portion of said SMS character string comprising at least one character defined to filter said SMS text message as a function of a predetermined distribution comprises at least one character defined to differentiate a first SMS text message receiving device from a second SMS text message receiving device.

13. An SMS system in accordance with claim 12, wherein said at least one SMS text message transmission device is further configured to transmit said SMS character string, wherein said at least one character defined to differentiate a first SMS text message receiving device from a second SMS text message receiving device comprises a plurality of characters that determine a distribution of said SMS text message as a function of a subject of said SMS text message.

14. An SMS system in accordance with claim 9, wherein said at least one SMS text message transmission device is further configured to transmit said SMS character string, wherein said fourth portion of said SMS character string comprising at least one character defining said body of said SMS text message comprises at least one character defined to configure said body of said SMS text message comprising text formatting including at least one of italicized text, bold text, and text with a color other than black.

15. A communication system comprising:
   at least one database server;
   a short message service (SMS) system coupled in communication with said at least one database server, said SMS system comprising:
      at least one SMS text message transmission device configured to transmit an SMS character string comprising:
         a first portion comprising at least one character defined to be indicative of a predetermined priority of an SMS text message;
         a second portion comprising at least one character defined to distinguish whether said SMS text message is one of desirable and non-desirable, wherein non-desirable SMS text messages include spam;
         a third portion comprising at least one character defined to filter said SMS text message as a function of a predetermined distribution; and
         a fourth portion comprising at least one character defining a body of said SMS text message; and
      at least one SMS text message receiving device coupled in communication with said at least one SMS text message transmission device, said at least one SMS text message receiving device configured to notify a user of the predetermined priority of said SMS text message.

16. A communication system in accordance with claim 15, wherein said at least one SMS text message transmission device is configured to transmit said SMS text message in which said at least one character in said first portion of said SMS character string configured to be indicative of a predetermined priority of said SMS text message comprises a first character of said SMS character string.

17. A communication system in accordance with claim 15, wherein said at least one SMS text message transmission device and said at least one SMS text message receiving device are further configured to share a unique identification key, wherein said second portion of said SMS character string comprising at least one character defined to distinguish whether said SMS text message is one of desirable and non-desirable comprises at least one character associated with said unique identification key, wherein said unique identification key identifies said SMS text message as one of desirable and non-desirable.

18. A communication system in accordance with claim 15, wherein said at least one SMS text message transmission device is further configured to transmit said SMS character string, wherein said third portion of said SMS character string comprising at least one character defined to filter said SMS text message as a function of a predetermined distribution comprises at least one character defined to differentiate a first SMS text message receiving device from a second SMS text message receiving device.

19. A communication system in accordance with claim 15, wherein said at least one SMS text message transmission device is further configured to transmit said SMS character string, wherein said fourth portion of said SMS character string comprising at least one character defining said body of said SMS text message comprises at least one character defined to configure said body of said SMS text message comprising text formatting including at least one of italicized text, bold text, and text with a color other than black.

20. A communication system in accordance with claim 15, wherein said at least one database server is coupled in communication with at least one database, said database includes at least one record that represents at least one of:
   an SMS notification status of said SMS text message transmitted by said at least one SMS text message transmission device; and
   an SMS acknowledgement status by the user of said at least one SMS text message receiving device.

* * * * *